United States Patent
Yu et al.

(10) Patent No.: US 10,464,136 B2
(45) Date of Patent: Nov. 5, 2019

(54) PREPARATION METHOD OF COPPER NANO-STRUCTURES

(71) Applicant: UNIVERSITY-INDUSTRY COOPERATION GROUP OF KYUNG HEE UNIVERSITY, Gyeonggi-do (KR)

(72) Inventors: Taekyung Yu, Seoul (KR); Woo-Sik Kim, Seoul (KR); Zengmin Tang, Gyeonggi-do (KR)

(73) Assignee: University-Industry Cooperation Group of Kyung Hee University, Gyeonggi-Do (KR)

( * ) Notice: Subject to any disclaimer, the term of this patent is extended or adjusted under 35 U.S.C. 154(b) by 329 days.

(21) Appl. No.: 15/262,180

(22) Filed: Sep. 12, 2016

(65) Prior Publication Data

US 2017/0260605 A1    Sep. 14, 2017

(30) Foreign Application Priority Data

Mar. 11, 2016   (KR) .................. 10-2016-0029770

(51) Int. Cl.
*B22F 1/00*     (2006.01)
*B22F 9/24*     (2006.01)
*B82Y 40/00*    (2011.01)

(52) U.S. Cl.
CPC .............. *B22F 9/24* (2013.01); *B22F 1/0018* (2013.01); *B82Y 40/00* (2013.01); *Y10S 977/952* (2013.01)

(58) Field of Classification Search
None
See application file for complete search history.

(56) References Cited

U.S. PATENT DOCUMENTS

| 2013/0008690 A1* | 1/2013 | Wiley | H01B 1/026 174/120 C |
| 2016/0047804 A1* | 2/2016 | Mehra | G01N 21/554 435/5 |

FOREIGN PATENT DOCUMENTS

| KR | 10-0790458 | 1/2008 |
| KR | 10-1423563 | 8/2014 |
| KR | 10-2016-0053352 | 5/2016 |
| WO | WO 2009/115643 | 9/2009 |

OTHER PUBLICATIONS

Tang et al., "Cost-effective aqueous-phase synthesis of long copper nanowires", *RSC Adv.*, 5: 83880-83884, 2015.
Cui et al. "Synthesis of ultrathin copper nanowires using tris (trimethylsilyl) silane for high-performance and low-haze transparent conductors." *Nano letters* 15.11 (2015): 7610-7615.

\* cited by examiner

*Primary Examiner* — Humera N Sheikh
*Assistant Examiner* — Xiaobei Wang
(74) *Attorney, Agent, or Firm* — Parker Highlander PLLC

(57) ABSTRACT

Provided is a preparation method of copper nanostructures, characterized in that a copper precursor including halide is reacted with polyethyleneimine (PEI) and a reducing agent in an aqueous solution. According to this method, the copper nanostructures may be easily prepared in a sphere, wire, or plate form, and high-quality copper nanostructures may be produced with a high production yield of 90% or more. This method is also appropriate for large-scale production.

7 Claims, 20 Drawing Sheets

FIG. 1
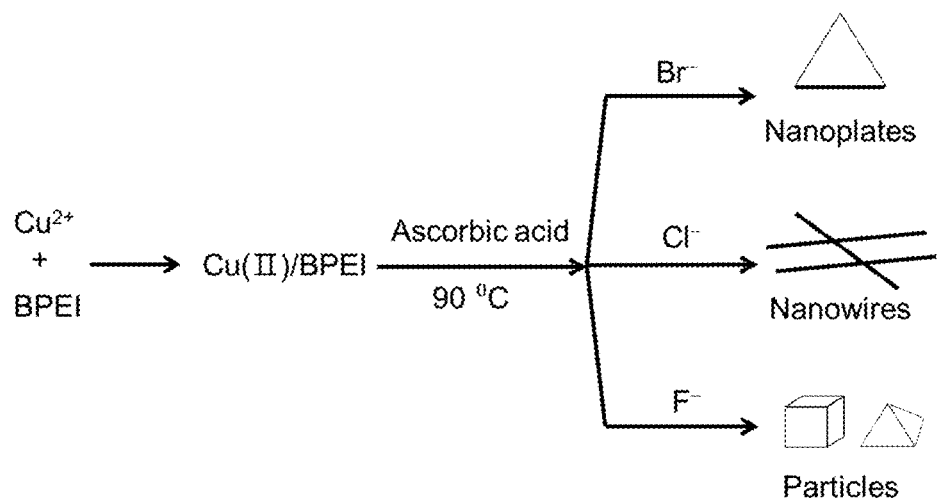
FIGS. 2A-D
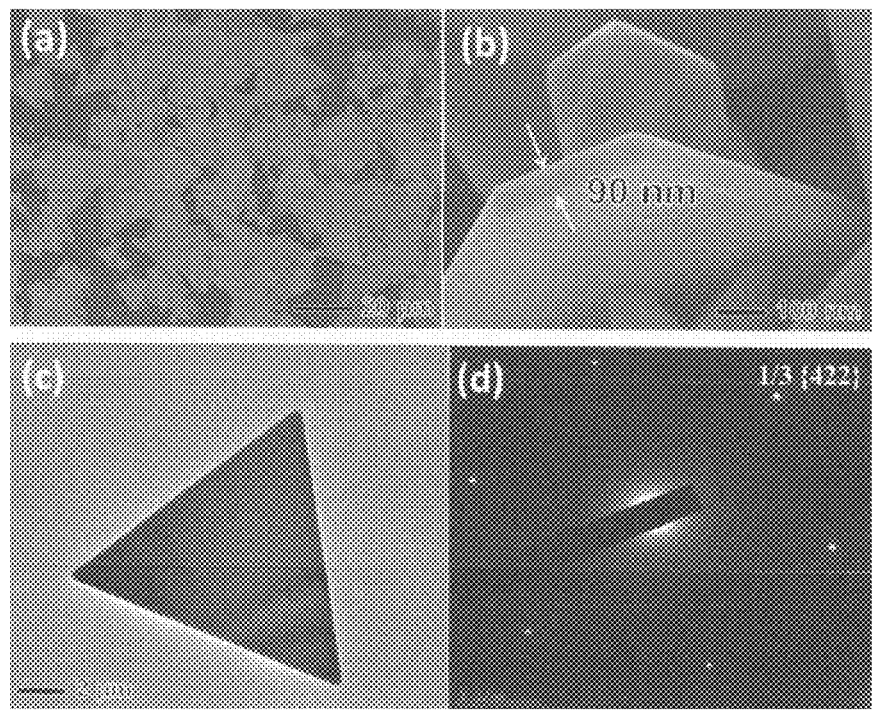

FIGS. 4A-B
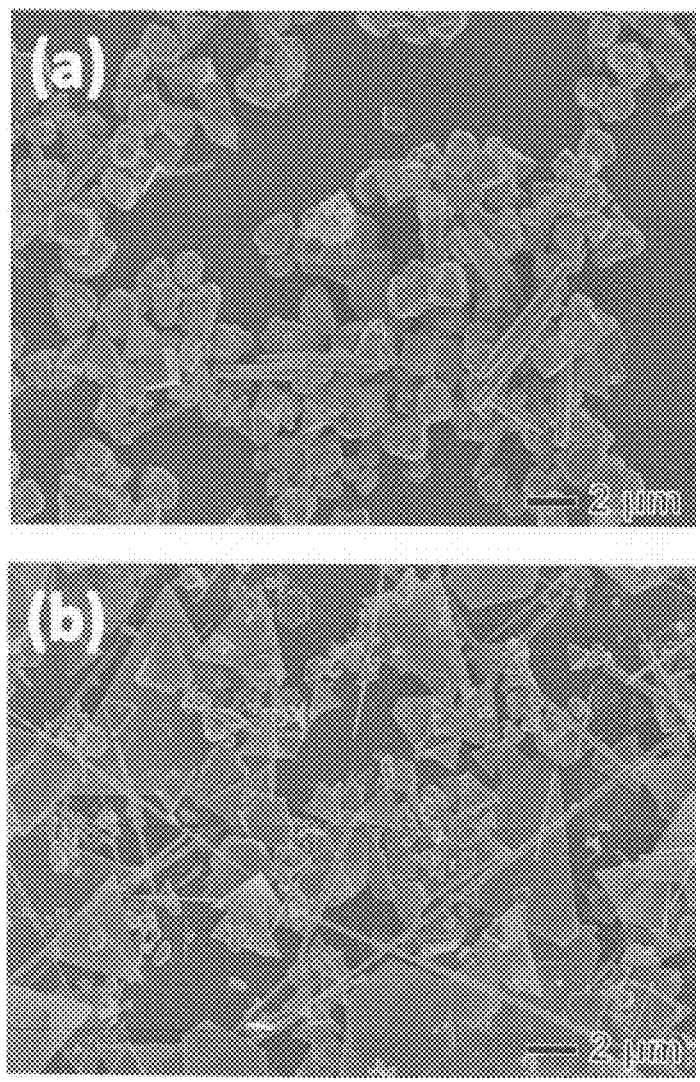

FIGS. 5A-B
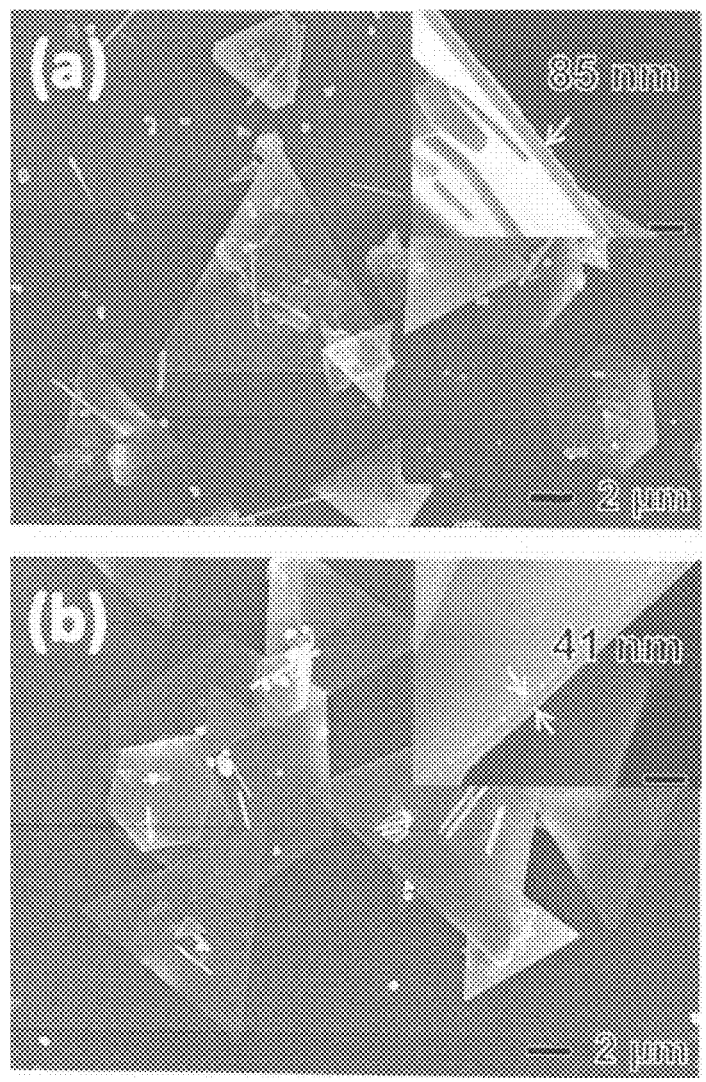

FIGS. 6A-D
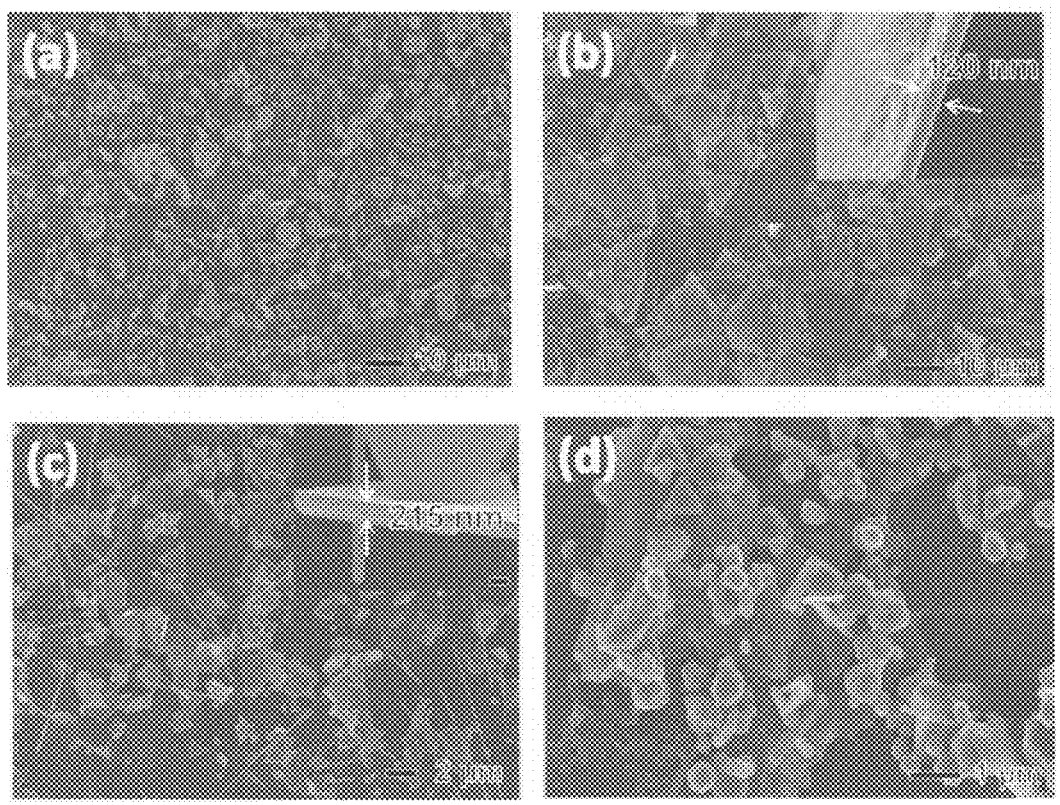

FIGS. 7A-D
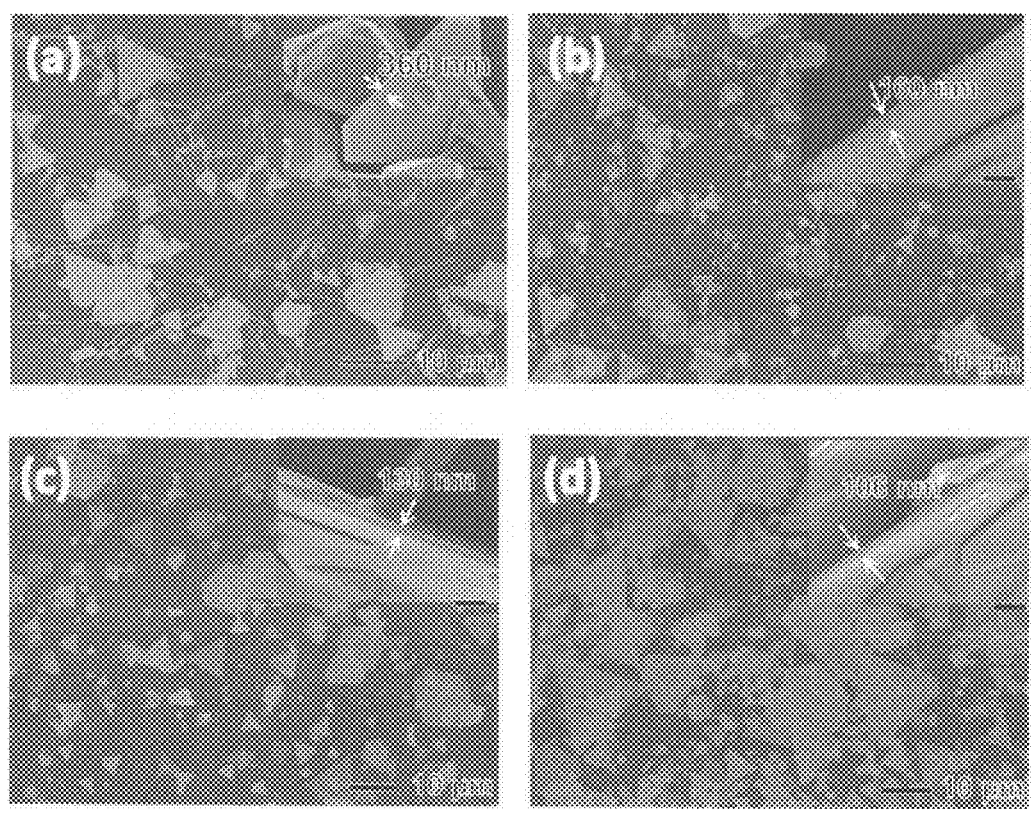
FIG. 8
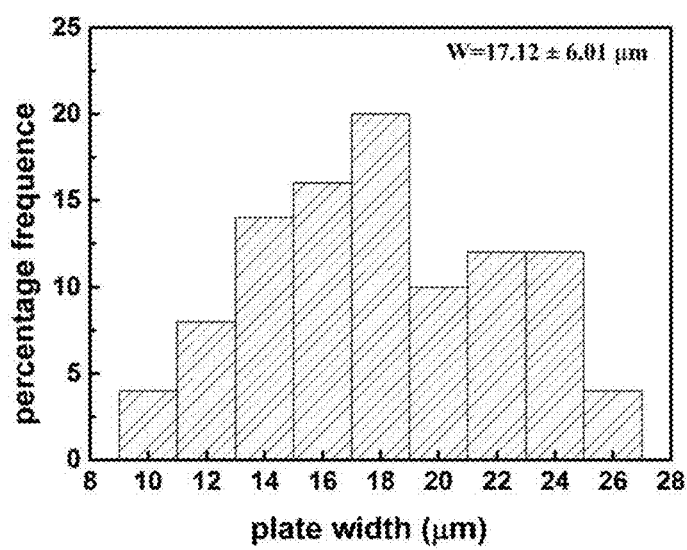

FIGS. 12A-D
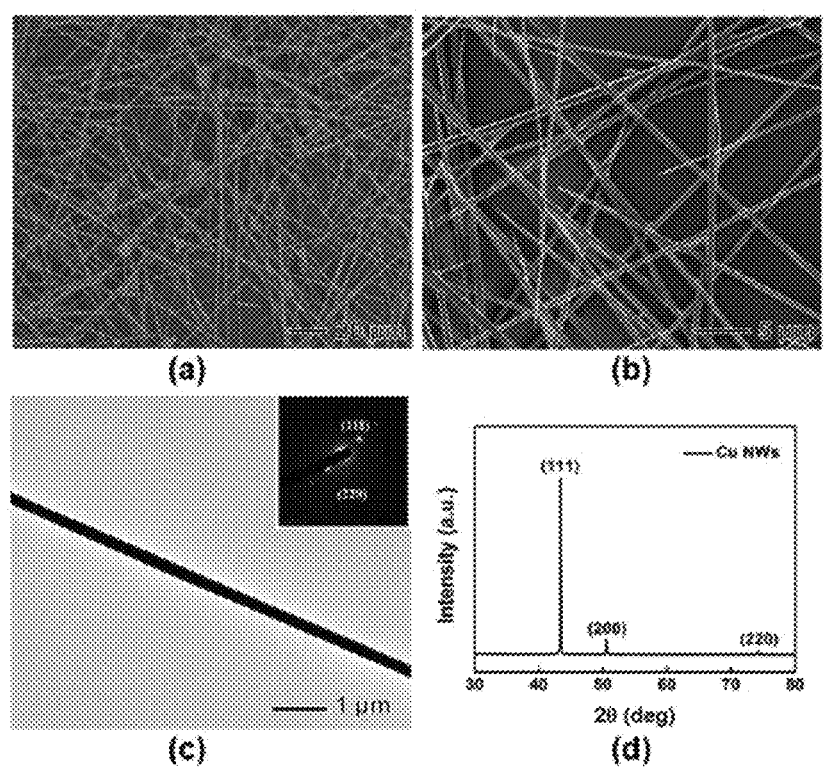

FIGS. 13A-B
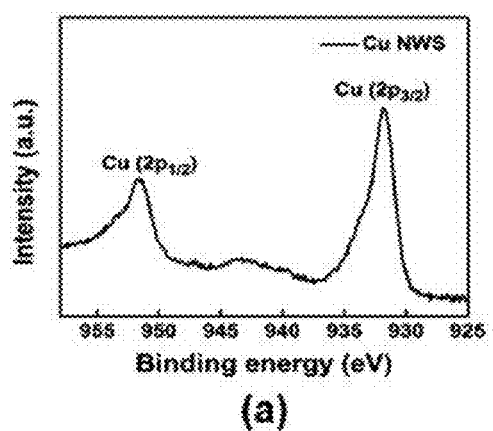
(a)
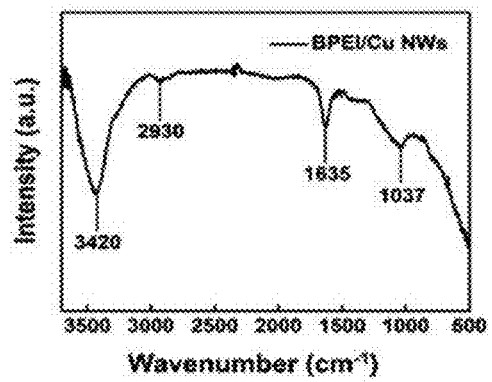
(b)

FIGS. 14A-D
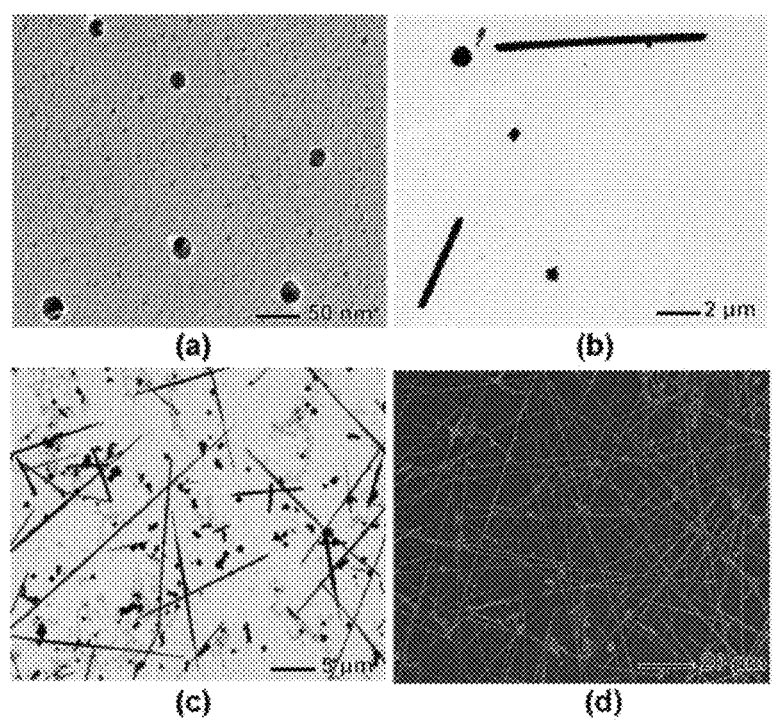

FIGS. 15A-B
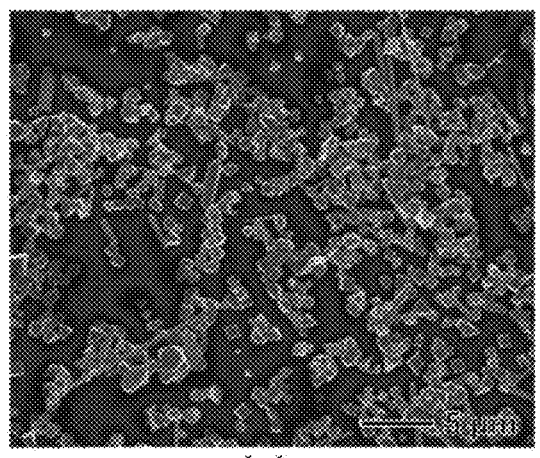
(a)
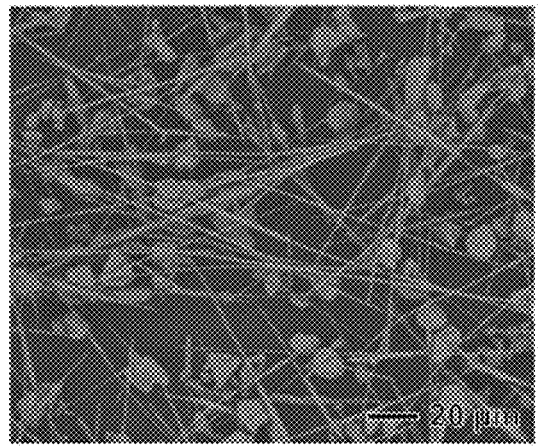
(b)

FIGS. 16A-D
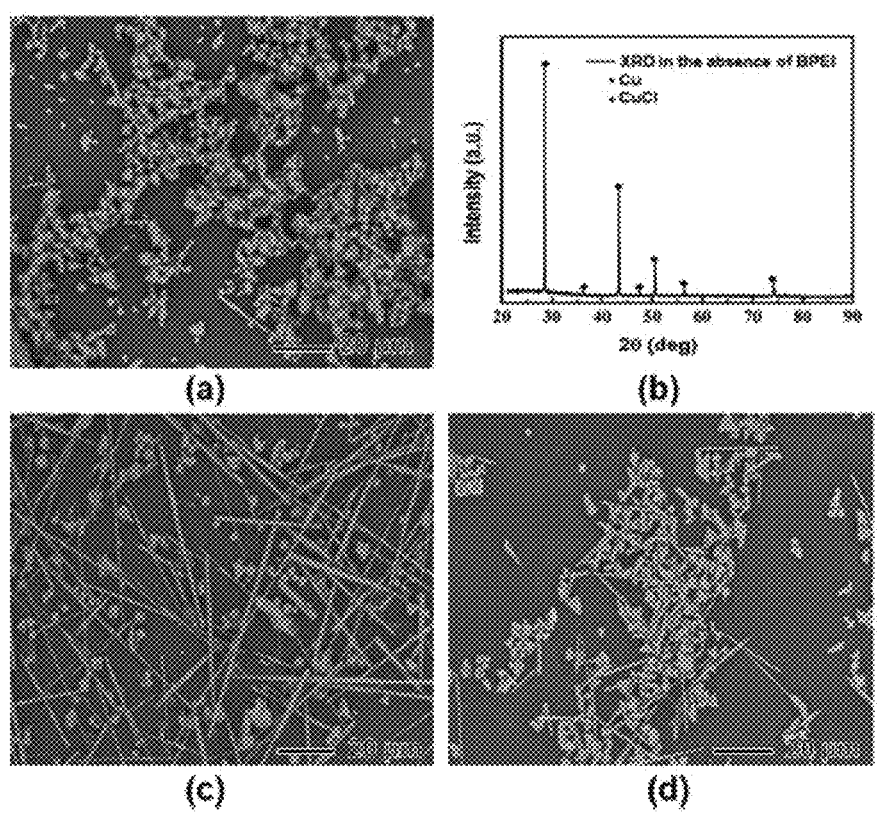

FIGS. 17A-B
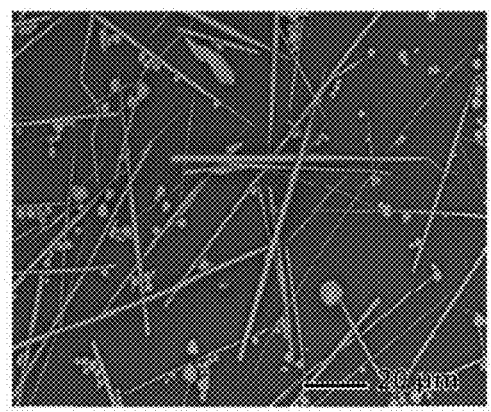
(a)
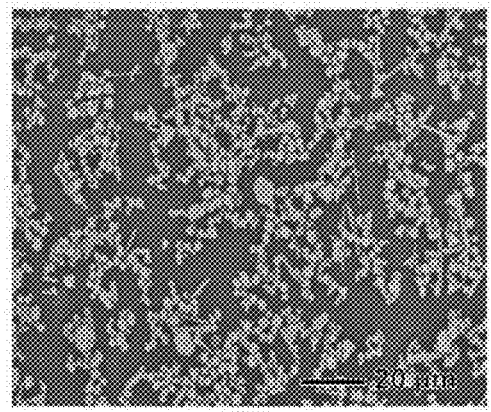
(b)

FIGS. 18A-B
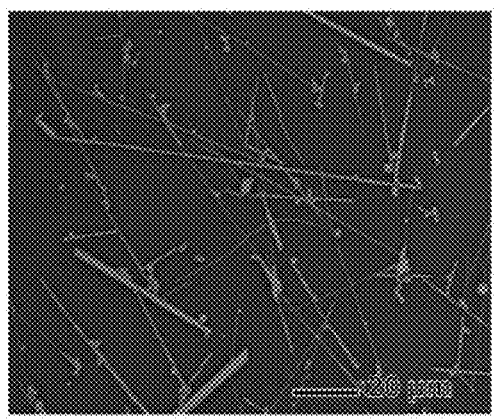
(a)
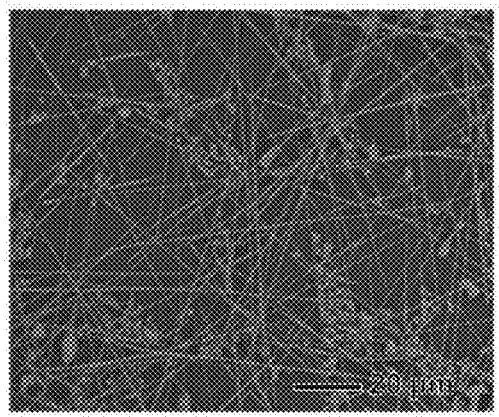
(b)

FIGS. 21A-B
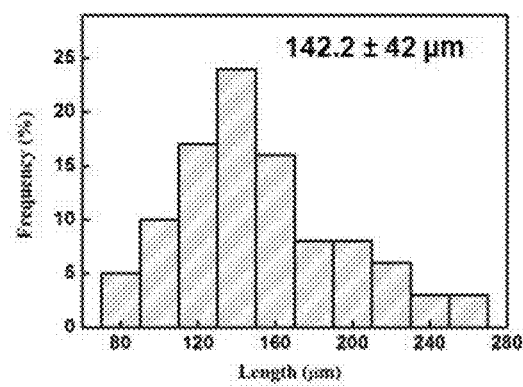
(a)
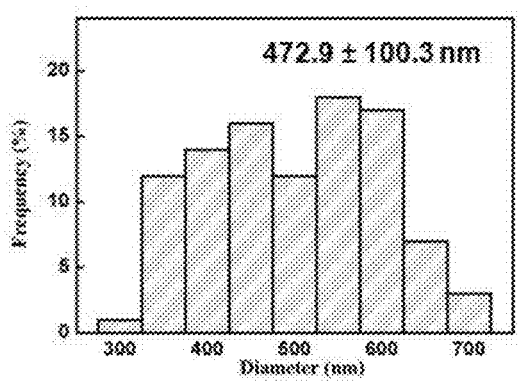
(b)
FIG. 22
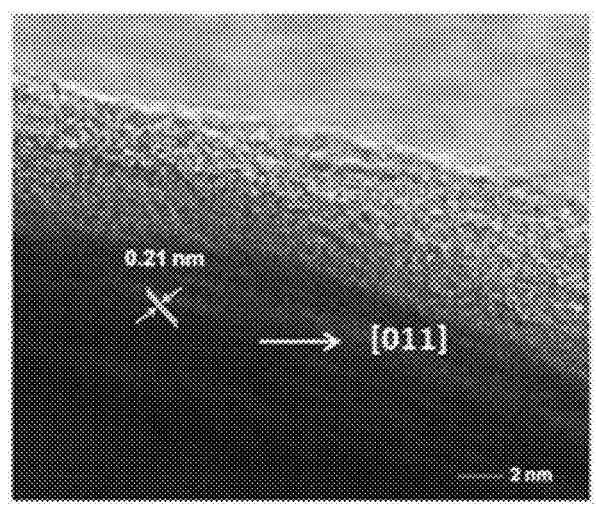

FIGS. 24A-B
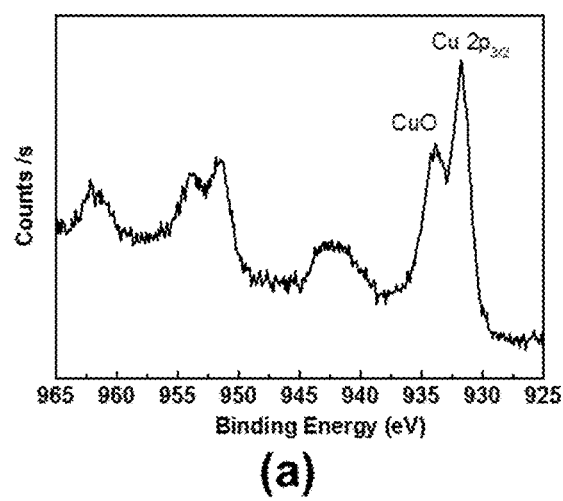
(a)
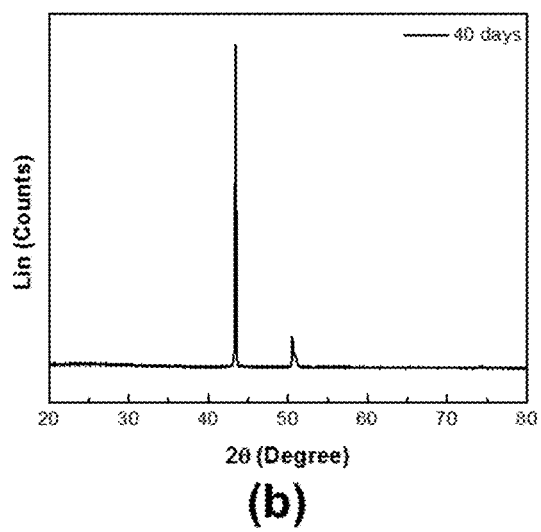
(b)

PREPARATION METHOD OF COPPER NANO-STRUCTURES

BACKGROUND OF THE INVENTION

1. Field of the Invention

The present disclosure relates to a method of preparing copper nanostructures with various morphologies, and specifically, to a method of preparing copper nanostructures with various morphologies by reducing a copper precursor compound in an aqueous solution, in which halide ions are used to prepare the copper nanostructures in a more efficient and easier manner.

2. Description of the Related Art

Metal nanoparticles are diversely utilized in electronics, optics, catalysts, and biological fields due to their physicochemical properties. Specifically, metal nanoparticles having electrical conductivity may be used to prepare conducting films, and therefore, metallic nanoparticles have received considerable attention in the fields of smart windows, rewritable electronic papers, electronic panel displays, flexible displays, etc. Particularly, copper is a metal that attracts much attention due to excellent electrical conductivity and low cost.

These metal nanoparticles may be prepared by various methods including a reduction-precipitation method in an aqueous solution, an electrochemical method, an aerosol method, a reverse microemulsion method, a chemical liquid phase deposition method, a photochemical reduction method, and a chemical reduction method in a solution, etc. However, such preparation methods are either very complicated or exhibit very low yield, and thus there has been a need for the development of a novel improved method.

On the other hand, since particle characteristics (unique plasmonic effect) vary depending on the shape and size of nanoparticles, many efforts have been made to control their shape and size.

For example, two-dimensional (2D) nanostructure such as nanodisks, nanosheets, and nanoplates has great physical and chemical properties because of their high aspect ratio of the size and thickness. A plate-shaped, copper nanostructure having 2D nanostructure is also a promising alternative novel metal material in flexible conductors because of its excellent electrical conductivity, flexibility, and transparency. However, the previous methods of preparing the plate-shaped copper nanostructures are not appropriate for large-scale production of high-quality plate-shaped copper nanostructures with sharp edges over a wide size range of 10 μm. As one of the previous methods of preparing the plate-shaped copper nanostructures, there is a method of reducing $Cu(OAC)_2$ with hydrazine in the presence of poly(vinyl pyrrolidone) (PVP) under the oil-phase.

To date, the aqueous synthesis methods have been considered. One of them is a method of reducing CuCl by using ascorbic acid in the presence of cetyltrimethylammonium bromide (CTAB) as a capping agent. However, this method requires a high reaction temperature of 120° C., and the resulting plate-shaped copper nanostructures are as short as 1-3 μm in edge length.

Another method is to use polyvinylpyrrolidone (PVP) as a capping agent and potassium sodium tartrate as a complexing agent in synthesis of the plate-shaped copper nanostructures. However, there are problems that this method takes a long time (24 hrs) at a relatively high temperature (100° C.), and the resulting plate-shaped copper nanostructures are shorter in edge length (0.18 μm~0.28 μm).

Furthermore, there is a method of synthesizing wire-shaped copper nanostructures using ethylenediamine (EDA) as a capping agent and polyvinylpyrrolidone (PVP) as a stabilizer. However, this method requires multiple steps and the resulting wire-shaped copper nanostructures are as short as 10 μm~20 μm. Therefore, there is a demand for a simple and economic method capable of synthesizing high-quality long copper nanostructures.

Accordingly, the present inventors have completed a method capable of preparing copper nanostructures with various shapes in a simple manner, in which the copper nanostructures show long-term stability without formation of copper oxides on the surface of copper nanostructures.

SUMMARY OF THE INVENTION

An object of the present invention provides a method of preparing copper nanostructures with various morphologies in a simple manner by controlling a capping agent.

Another object of the present invention provides a method of preparing copper nanostructures with various morphologies in a spherical form (particle), a wire form, or a plate form.

DETAILED DESCRIPTION OF INVENTION

A first aspect of the present invention provides a preparation method of a copper nanostructure, characterized in that a copper precursor including halide is reacted with polyethyleneimine (PEI) and a reducing agent in an aqueous solution (see FIG. 1).

The preparation method of the present invention may be used to produce the nanostructure in a spherical form, a wire form, or a plate form by using fluoride, chloride, or bromide as halide, respectively.

A second aspect of the present invention provides a copper nanostructure of a spherical form, a wire form, or a plate form, which is prepared according to the first aspect.

A third aspect of the present invention provides an electronic device including the copper nanostructure according to the second aspect.

Hereinafter, the present invention will be described in detail.

In the present invention, there is no limitation in a copper precursor, as long as the copper precursor is a material including a copper ion and a halide ion. The cooper precursor functions as a capping agent as well as functions to provide a copper material as a metal. For example, as the copper precursor, $CuCl_2$, $CuBr_2$, or $CuF_2$ may be used, and $Cu(NO_3)_2$ may be also used together with one of KCl, KBr, and KF. When $Cu(NO_3)_2$ is only used without the halide ion, there is a problem that irregular shaped copper nanostructures may be formed.

Depending on the kind of the halide ion used as the copper precursor, the structure or morphology (shape, size, thickness, length, etc.) of the copper nanostructure to be prepared may vary. For example, when a halide ion ($Cl^-$) is included in the cooper precursor, the copper nanostructure may be produced in a wire form. When a bromide ion ($Br^-$) is included in the cooper precursor, the copper nanostructure may be produced in a plate form. When a fluoride ion ($F^-$) is included in the cooper precursor, the copper nanostructure may be produced in a spherical form. The preparation method of the present invention is of great technical significance in that the morphology (shape) of the copper nanostructure may be simply changed in various forms by varying the kind of the halide ion. In the present specification, a copper nanoplate means a plate-shaped copper nanostructure, a copper nanowire means a wire-shaped copper nanostructure, and a copper nanosphere means a sphere-shaped copper nanostructure.

In the preparation method of the nanostructures of the present invention, the amount of the copper precursor may influence the nanostructure preparation. The metal precursor may be used at a concentration of 0.01 M to 1.5 M, and preferably, at a concentration of 0.01 M to 1 M. Considering the control of preferred particle size and the reaction efficiency, the amount of the metal precursor may be appropriately selected within the above concentration range. When the concentration of the metal precursor is below the range, the preparation efficiency may become low, and it may be difficult to control the particle size. In contrast, when the concentration of the metal precursor exceeds the range, the reaction time may be shortened, but it may be difficult to control the particle size due to an aggregation of particles, and the reagent may be wasted due to excessive use of the metal precursor.

In the present invention, any polyethyleneimine (PEI) may be used, irrespective of its molecular structure. Specifically, PET is largely divided into a branched one and a linear one. A branched polyethyleneimine (BPEI) may be represented by the following Chemical Formula 1, and a linear polyethyleneimine (LPEI) may be represented by the following Chemical Formula 2. Both BPEI and LPEI may be used, but BPEI may be preferably used. Polyethyleneimine functions as a stabilizer.

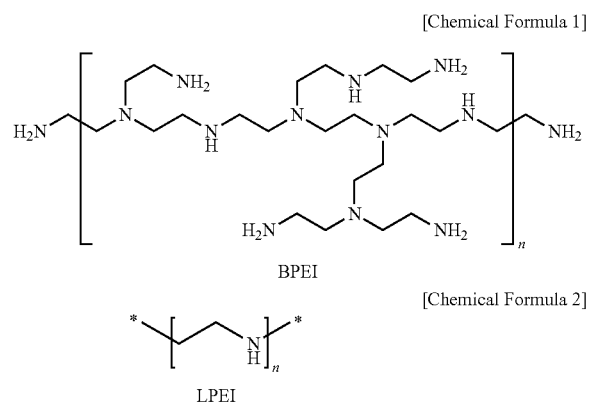

[Chemical Formula 1]

BPEI

[Chemical Formula 2]

LPEI

In Chemical Formula 1 or 2, n may be an integer of 42 to 23,256.

The polyethyleneimine may be any polyethyleneimine regardless of a molecular weight (a degree of polymerization). PEI having a molecular weight of preferably 20,000 to 1,000,000, and more preferably, 200,000 to 750,000 may be used.

In addition to the polyethyleneimine, polyvinylpyrrolidone (PVP) may be further added as a co-stabilizer, and in particular, use of the co-stabilizer in the preparation of plate-shaped copper nanostructures is preferred. The co-stabilizer functions to inhibit production of copper nanorods or nanowires, and function to help production of copper nanoplates.

A content of the co-stabilizer may be 1 mg to 5 g, and preferably 10 mg to 500 mg, based on 5 ml of the total solution.

A reducing agent which may be used in the preparation method of the nanostructures of the present invention may be one or more selected from the group consisting of ascorbic acid, sodium hydroxide (NaOH), potassium hydroxide (KOH), hydrazine ($N_2H_4$), sodium hydrophosphate, glucose, tannic acid, dimethylformamide, tetrabutylammonium borohydride, sodium borohydride ($NaBH_4$), and lithium borohydride ($LiBH_4$). Preferably, the reducing agent may be ascorbic acid which is a weak reducing agent.

In the preparation method of the nanostructures of the present invention, the amount of the reducing agent may influence the nanostructure preparation. Preferably, the reducing agent may be used at a concentration of 0.1 M to 1.5 M. Considering the control of preferred particle size and the reaction efficiency, the amount of reducing agent may be appropriately selected within the concentration range. When the amount of the reducing agent is below the concentration range, the reaction time increases and a complete reduction reaction may not occur, thereby decreasing the yield. In contrast, when the amount of the reducing agent exceeds the above concentration range, the reaction time may be shortened, but it is difficult to obtain nanostructures of uniform sizes.

Aggregation phenomena, size uniformity, and the production efficiency of the nanostructures may vary depending on a weight ratio of polyethyleneimine to copper precursor in the preparation method of the nanostructures of the present invention. The capping ability of polyethyleneimine for the amount of the metal precursor should be sufficiently provided in order to readily produce nanostructures. According to the present invention, the weight ratio of polyethyleneimine to metal precursor in a reaction solution may be 1:1 to 20:1, and preferably, 2:1 to 15:1. When the polyethyleneimine content is lower than the above ratio, the growth of the particles may not be controlled due to insufficient capping ability, and thus binding between particles may occur, leading to an intermolecular aggregation. In contrast, when the polyethyleneimine content is higher than the above ratio, the metal precursor and polyethyleneimine may form a stable metal-polyethyleneimine polymer, thereby increasing the reaction time, decreasing the production efficiency because it is difficult to control the size and thickness of nanostructures, and as a result, it may not be easy to remove the nanostructures during washing.

In the preparation method of the nanostructures of the present invention, a reaction temperature may also influence the nanostructure preparation. When the reaction temperature is low, the particle size of nanostructures may not be uniform, thereby decreasing the production efficiency. In contrast, as the reaction temperature increases, the size of nanostructures generally decreases, becoming uniform, thereby increasing the reaction rate. However, once the temperature exceeds a certain temperature, there is no noticeable improvement. Considering these facts, the reaction may be preferably performed at 65° C. to 110° C., and more preferably, 70° C. to 100° C.

In the preparation method of the nanostructures of the present invention, it is preferable that the reaction is allowed at pH under acidic conditions, in terms of uniform particle size, dispersion and stability. In an embodiment, pH may be 2 to 7, and preferably, 2 to 6.

The preparation method of the copper nanostructures of the present invention may be performed in an aqueous solution. That is, water may be used as a main solvent. In the previous preparation methods, solvents being toxic to human body or accompanying environmental problems, such as organic solvents, have been generally used. In contrast, the present invention has an effect of significantly improving these problems. Therefore, the method of the present invention is advantageous in that it does not require an additional waste water disposal facility or air purification system, which provides great industrial and environmental benefits.

When the copper nanostructure is a nanoplate, its thickness may be about 40 nm to about 400 nm, and its size may be about 3 µm to about 200 µm.

When the copper nanostructure is a nanowire, its average length may be about 140 µm to about 180 µm, and in an embodiment, the diameter may be about 470 nm.

When the copper nanostructure is a nanosphere, its size may have a diameter of about 200 nm to about 600 nm.

The copper nanostructures of the present invention may be used in electronic devices. The electronic devices may include smart windows, rewritable electronic papers, electronic panel displays, or flexible displays. The copper nanostructures of the present invention are inexpensive and exhibit high conductivity and excellent stability, and therefore, they may be alternative metal materials used in electronic devices.

The copper nanostructures of the present invention may be also used in catalysts, antibacterial agents, conductive inks, solar batteries, etc., in addition to the electronic devices.

EFFECT OF THE INVENTION

According to a preparation method of the present invention, the morphology and size (including thickness, length, etc.) of the copper nanostructures may be easily changed in a sphere, wire, or plate form by varying halide ions included in a copper precursor, and high-quality copper nanostructures may be produced with a high production yield of 90% or more. This method is also appropriate for large-scale production. Further, this method is performed under economic and mild reaction conditions including a relatively low reaction temperature, use of inexpensive and nontoxic reagents, a short reaction time, and air atmosphere. This method is also an environmentally friendly method, because water is used as a solvent. Furthermore, the preparation method of the present invention is a single step reaction to reduce production costs, and the prepared copper nanostructures exhibit long-term stability

BRIEF DESCRIPTION OF THE DRAWINGS

FIG. 1 is a schematic illustration showing a synthetic process of copper nanostructures according to an embodiment of the present invention;

FIGS. 2A-D show SEM images (A and B), TEM image (C), and SAED image (D) of plate-shaped copper nanostructures synthesized according to Example 1;

FIGS. 4A-B show the result of synthesis by using $Cu(NO_3)_2$ instead of $CuBr_2$ (A), and the result of synthesis in the presence of $Cu(NO_3)_2$ and KBr (B);

FIGS. 5A-B show SEM images of plate-shaped copper nanostructures synthesized in the presence of different amounts of KBr, in which (a) an average edge length of the plate-shaped copper nanostructures was about 9.26±2.76 µm in the presence of 500 mmol of KBr, and (b) an average edge length of the plate-shaped copper nanostructures was about 9.15±4.91 µm in the presence of 700 mmol of KBr;

FIGS. 6A-D show SEM images of plate-shaped copper nanostructures synthesized at different weight ratios of $BPEI/CuBr_2$ ((a) 1.35, (b) 6.3, (c) 13.4, (d) 18), in which an edge length of the plate-shaped copper nanostructures was (a) 12.73±4.39 µm and (b) 3.54±0.79 µm, respectively, and the sale bar is 100 nm;

FIGS. 7A-D show SEM images of plate-shaped copper nanostructures synthesized at different addition amounts of PVP ((a) 0 mg, (b) 1 mg, (c) 10 mg, (d) 100 mg), in which an edge length of the plate-shaped copper nanostructures was (a) 8.03±3.18 µm, (b) 8.37±4.18 µm, (c) 15±4.43 µm, and (d) 16.77±7.61 µm, respectively, and the sale bar is 300 nm;

FIG. 8 shows the size of plate-shaped copper nanostructures synthesized according to Example 1;

FIGS. 12A-D show (a) low magnification SEM image, (b) high magnification SEM image, (c) TEM and SAED patterns, and (a) powder XRD patterns of wire-shaped copper nanostructures synthesized by reducing $CuCl_2$ with ascorbic acid in the presence of BPEI in an aqueous phase at 90° C. for 3 hours;

FIGS. 13A-B show (a) XPS spectra and (b) FT-IR spectra of wire-shaped copper nanostructures synthesized by reducing $CuCl_2$ with ascorbic acid in the presence of BPEI in an aqueous phase at 90° C. for 3 hours;

FIGS. 14A-D show TEM images (a and b) and SEM images (c and d) of wire-shaped copper nanostructures synthesized for the reaction time of (a) 15 min, (b) 20 min, (c) 30 min, or (d) 3 hrs;

FIGS. 15A-B show (a) SEM image of cubic and pyramidal copper nanoparticles prepared by reducing $CuCl_2$ with ascorbic acid in the presence of BPEI in an aqueous phase at 90° C. for 3 hours, in the presence of $Cu(NO_3)_2$ as a precursor instead of $CuCl_2$, and (b) SEM image of the copper nanoparticles prepared under same conditions, except that synthesis was conducted in the presence of $Cu(NO_3)_2$ and KCl instead of $CuCl_2$;

FIGS. 16A-D show (a) SEM image and (b) XRD patterns of wire-shaped copper nanostructures prepared by reducing $CuCl_2$ with ascorbic acid in the presence of BPEI in an aqueous phase at 90° C. for 3 hours at a weight ratio of $BPEI/CuCl_2$ of 0, that is, in the absence of BPEI, and SEM images of the wire-shaped copper nanostructures under the same conditions except that a weight ratio of $BPEI/CuCl_2$ was (c) 0.1 and (d) 1.2;

FIGS. 17A-B show SEM images of wire-shaped copper nanostructures prepared by reducing $CuCl_2$ with ascorbic acid in the presence of BPEI in an aqueous phase at 90° C. for 3 hours at different pH values of (a) 1.8 and (b) 5.3, respectively;

FIGS. 18A-B shows SEM images of wire-shaped copper nanostructures prepared by reducing $CuCl_2$ with ascorbic acid in the presence of BPEI in an aqueous phase at 90° C. for 3 hours at different reaction temperatures of (a) 60° C. and (b) 100° C., respectively;

FIGS. 21A-B show graphs of (a) average length and (b) average diameter of wire-shaped copper nanostructures synthesized according to Example 6;

FIG. 22 shows an HRTEM image of wire-shaped copper nanostructures synthesized according to Example 6;

FIGS. 24A-B show (a) XRD and (b) XPS of wire-shaped copper nanostructures synthesized according to Example 6, after being exposed to air for 40 days and washed with ethanol.

DETAILED DESCRIPTION OF THE PREFERRED EMBODIMENTS

Figure 3A:
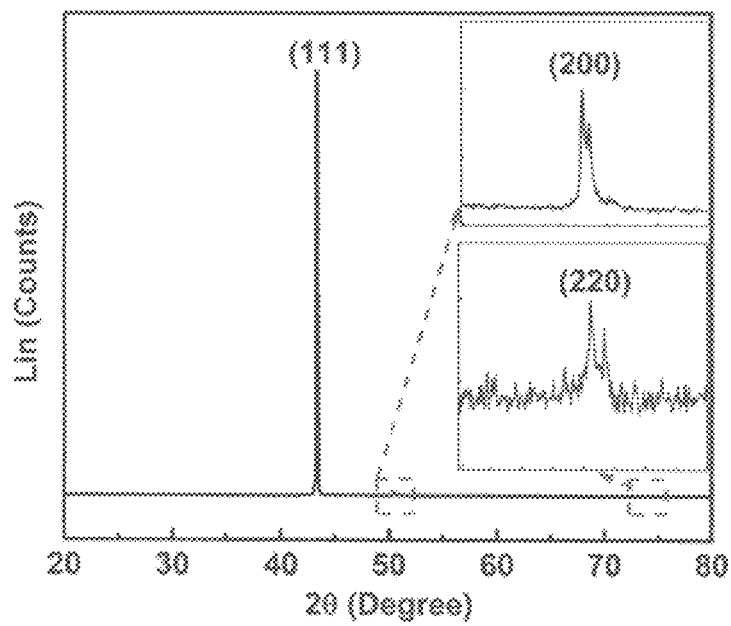
FIGS. 3A-B show XRD (A) and XPS (B) spectra of plate-shaped copper nanostructures synthesized according to Example 1.
Figure 3B:
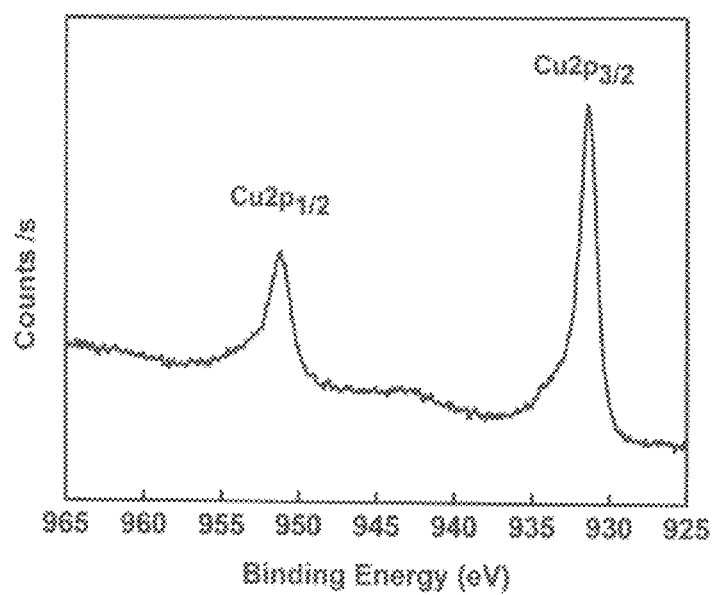

Hereinafter, the present invention will be described in more detail with reference to Examples. However, these Examples are for illustrative purposes only, and the scope of the present invention is not intended to be limited by these Examples.

Preparation of Plate-Shaped Copper Nanostructures
Preparation of Materials

Copper bromide ($CuBr_2$, purity≥95%), copper nitrate ($Cu(NO_3)_2$), BPEI (MW=750,000, 50 wt % solution in water), polyvinylpyrrolidone (PVP, MW=10,000), ascorbic acid ($C_6H_8O_6$, purity≥99%), sodium hydroxide (NaOH, purity≥98%), potassium bromide (KBr), and nitric acid ($HNO_3$, 70%) were purchased from Aldrich, and were used without further purification. Water was purified water (de-ionized water, DI water).

Measurement Method

Powder X-ray diffraction (XRD) patterns of the products were obtained using a Rigaku D-MAX/A diffractometer at 35 kV and 35 mA. Transmission electron microscopy (TEM) and high-resolution TEM (HRTEM) images were captured using a JEM-2100F microscope operating at 200 kV. Scanning electron microscopy (SEM) images were obtained using a LEO SUPRA 55 microscope. Further, X-ray photoelectron spectroscopy (XPS) data was obtained using a Thermo Scientific K-Alpha spectrometer.

Example 1

Preparation of Plate-Shaped Copper Nanostructure 60 mg of BPEI (MW=750,000) and 30 mg of PVP (MW=10,000) were dissolved in 2 mL of purified water using a magnetic bar. 100 μL of 1 M $CuBr_2$ solution was added to the solution using a micropipette with continuous magnetic stirring for 10 min, and 3 mL of L-ascorbic acid solution (0.6 M) was then added thereto. The pH of resulting solution was about 2.65. The resulting solution was heated at 90° C. for an appropriated reaction time while being stirred, and then cooled down to room temperature. The solution was washed with purified water three times to remove the remaining BPEI and ascorbic acid. As a result, a final product was obtained. The plate-shaped copper nanostructure thus obtained was re-dispersed in purified water.

Copper bromide was reacted with ascorbic acid in the presence of a capping agent including BPEI and PVP in an aqueous phase to prepare plate-shaped copper nanostructures. SEM confirmed that a large amount of high-quality copper nanoplates were produced in a simple manner by the reaction for about 12 hours.

FIG. 2a shows SEM images of plate-shaped copper nanostructures prepared in Example 1. The nanoplates have hexagonal, triangular, and truncated triangular shapes. All of the nanoplates also exhibited sharp edges. Even though these plates were considered to have a relatively large size of 17.12±6.01 μm, they were thin enough that the electron beam can penetrate through a stack of overlaying plates and allow the outlines of the underlying plates to be seen. The thicknesses of these plates were about 90 nm. The SEM images also show that the plate-shaped copper nanostructures were synthesized in a high percent yield, compared with particles and rods.

FIG. 2c showed a TEM image of a single triangular nanoplate. The plate surface appeared to be flat and the edges were sharp.

FIG. 2d shows the selected area electron diffraction (SAED) pattern, indicating that the nanoplates were single crystal and only presented the forbidden fraction 1/3{422}, which were caused by plane stacking fault.

In FIG. 3a, the powder XRD patterns show the presence of diffraction peaks at 43.25°, 50.40°, and 74.13°, which can be assigned to (111), (200), and (220) planes of face-centered cubic (FCC) copper, (Fm3m, a=3.615 Å, Joint Committee on Powder Diffraction Standard (JCPDS) file number 04-0836), respectively. Any diffraction peaks of pure crystalline phases were not observed. However, an exceedingly strong (111) diffraction peak was recorded. In contrast, the (200) and (220) diffraction peak were very weak. Thus, the nanoplates are essentially composed of (111) planes. The formation of nanoplates with essentially (111) facets may be the result of the lower free energy of the (111) plane relative to those of the (100) and (110) planes. XPS was used to probe the formation of $Cu_2O$ or CuO layers on the surface of the plate-shaped copper nanostructures. The two strong peaks at 932.1 and 952.2 eV were attributed to Cu $2p_{3/2}$ and Cu $2p_{1/2}$ core levels, confirming the metallic structure of the plate-shaped copper nanostructures. Any diffraction peaks of oxide phases such as $Cu_2O$ and CuO were not observed.

Experimental Example 1

Test of Long-Term Stability of Plate-Shaped Copper Nanostructure

Figure 9:
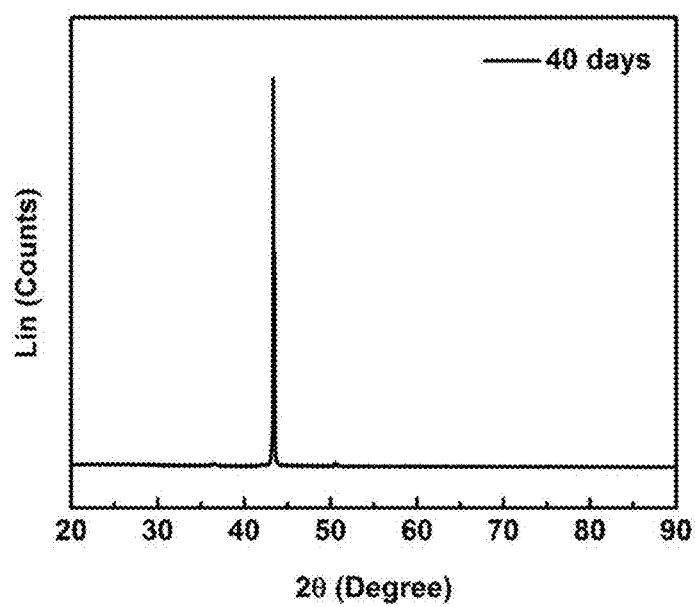
FIG. 9 shows XRD patterns of plate-shaped copper nanostructures synthesized according to Example 1, after being exposed to air for 40 days.

The plate-shaped copper nanostructures prepared according to Example 1 were stored at room temperature for 40 days, and then XRD patterns were analyzed. As shown in FIG. 9, XRD patterns measured immediately after synthesis were consistent with those measured at 40 days after synthesis. Even after being stored at room temperature for 40 days, the plate-shaped copper nanostructures showed only the presence of Cu metal without formation of $Cu_2O$ or CuO on the surface, indicating the long-term stability of the plate-shaped copper nanostructures.

Example 2

Preparation with Different Kinds of Copper Precursors

It is believed that halide ion influences control of the shape of the nanocrystal, $CuBr_2$ not only serves as a copper source but also provides abundant $Br^-$ ion after the reduction of the $Cu^{2+}$ ions, which was shown to have a dramatic effect on the final shape of the nanoplates. When the synthesis was conducted in the presence of $Cu(NO_3)_2$ as a precursor instead of $CuBr_2$ while keeping the other experimental conditions unchanged, copper nanoparticles with cubic, rod, and pyramidal shapes were observed as shown in FIG. 4a. On the other hand, large copper plates were observed when the synthesis was conducted in the presence of $Cu(NO_3)_2$ and KBr, as shown in FIG. 4b.

For better understanding the effect of $Br^-$ ions, KBr as additive was used to control the amount of $Br^-$ ion in the synthesis of plate-shaped copper nanostructures which was conducted in the presence of $CuBr_2$. FIG. 5a shows that plate-shaped copper nanostructures became shorter with an average edge length, of 9.26±2.76 μm but little changed in thickness under the addition of 0.03 mmol of KBr. When the addition amount of KBr increased to 0.05 mmol, the final plate-shaped copper nanostructures significantly reduced in thickness from 90 nm to 40 nm, as shown in FIG. 5b. Therefore, it was demonstrated that $Br^-$ ions could control the edge length and thickness of plate-shaped copper nanostructures.

Example 3

Preparation at Different Weight Ratios of BPEI/$CuBr_2$

Figure 10A:
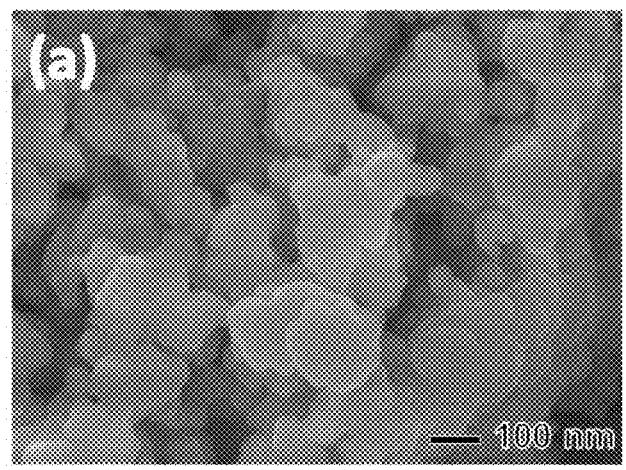
FIGS. 10A-B show (a) SEM images and (b) XRD spectra at a weight ratio of $BPEI/CuBr_2$ of 0.
Figure 10B:
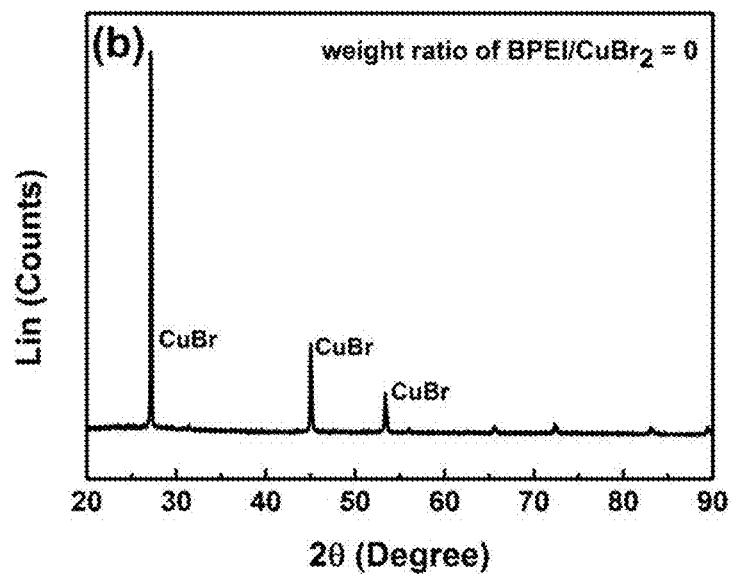

BPEI has high binding ability, because of having an unpaired electron pair on the N atom which can form donor bonds with the $Cu^{2+}$. To examine the role of the BPEI, firstly, the reaction process was studied in the absence of BPEI which a weight ratio of BPEI/$CuBr_2$ was 0. The SEM image shows that products with irregular and aggregated particles were generated which were copper bromide (CuBr, F-43m, a=5.405 Å, JCPDS file number 06-0292). FIG. 10B shows XRD.

FIG. 6a shows that as the weight ratio of BPEI/$CuBr_2$ was 1.4, the most of products showed triangle plate and wafer shape. FIG. 10 shows that the product was a mixture of Cu and CuBr instead of pure Cu metal. That is, the pure Cu metal could not be obtained under that condition of no or insufficient addition of BPEI. The role of BPEI is to form the Cu(II)/BPEI complexes, which can provide protection to make Cu ion transform into Cu directly instead of the formation of CuBr precipitate. Upon increasing the weight ratio of BPEI/$CuBr_2$ to 2.7, large plate-shaped copper nanostructures with long-term stability were successfully synthesized, as confirmed in FIG. 2. While the weight ratio of BPEI/CuBr2 increased to 6.3 and 13.4, final obtained copper plates decreased in the edge length and increased in the thickness, as shown in SEM images of FIGS. 6b and 6c. When the weight ratio of BPEI/$CuBr_2$ was as high as 18, many irregular copper particles were observed in the final products, as shown in FIG. 6d. It would be seem that the formation of a stable BPEI-Cu complex occurred via thermal dynamic growth of copper nanoparticles, thus limiting the formation and growth of large nanoplates.

Example 4

Preparation with Different PVP Amounts

The synthesis of copper products was conducted in the presence of BPEI but without any PVP under the typical experimental conditions. The plate-shaped copper nanostructures thus produced were 8.03±3.18 μm in edge length and 360 nm in thickness, but mixed with many impurities of copper rods in the products, as showed in FIG. 7a. The role of PVP in the synthesis of plate-shaped copper nanostructures would prefer to absorb on the {111} facets of copper to slow down their growth rate, and therefore, PVP can be available to inhibit the formation of copper rod and make larger plate. A small amount of PVP was introduced into the synthesis of plate-shaped copper nanostructures. FIGS. 7b and 7c show that upon adding 0.1 mg of PVP, the formation of copper rod was inhibited obviously and the thickness of final plates also were reduced to around 160 nm, as shown in SEM image. FIG. 7d shows that when the amount of PVP was continuously increased to 10 mg, the average edge length and the general morphology of copper plates was noticeably increased from 8.37±4.18 μm to 15±4.43 μm, the thickness was also reduced to around 150 nm. While further increasing the amount of PVP to 100 mg, the final products showed little change in the general morphology and the average size such as edge length and thickness, compared with the products shown in FIG. 1.

Example 5

Preparation at Different pH

Figure 11A:
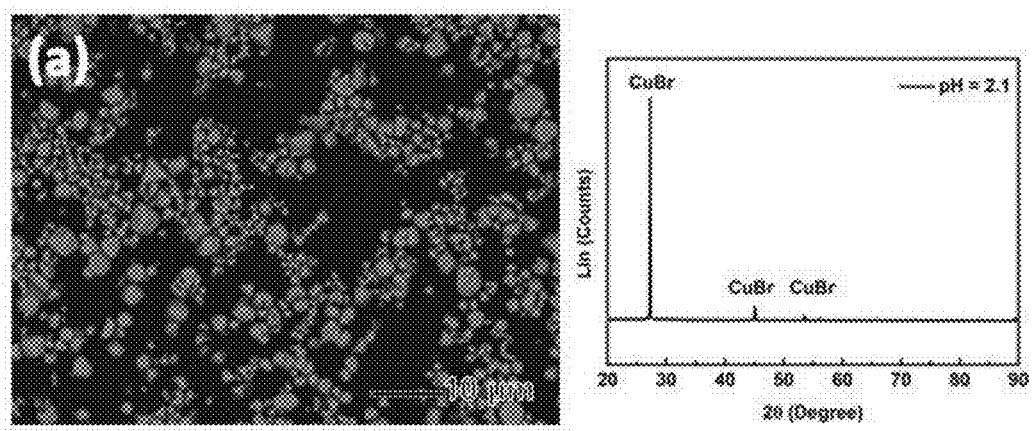
FIGS. 11A-B show (a) SEM images and XRD patterns of products only including CuBr particles with irregular shape at pH of 2.1, and (b) XRD patterns of copper metal and some copper products presented plate-like shape in final products at pH of 2.4.
Figure 11B:
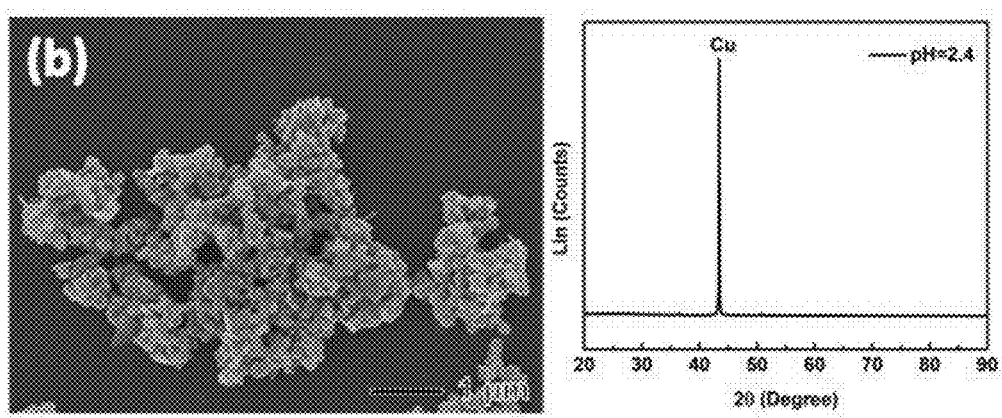

On the synthesis of Au and Ag nanoparticles using BPEI in an aqueous-phase, the protonated amine groups of BPEI have a weaker ability to stabilize Au and Ag nanoparticles under strong acidic conditions. At pH of 2.1, the obtained products only contained CuBr particles with irregular shape, as shown in the SEM image and XRB pattern of FIGS. 11a and 11b. As the pH was increased to 2.4, the final products were copper metal and some copper products presented plate-like shape, as shown in the XRD patterns of FIGS. 11c and 11d. With increasing pH from 3.5 to 7.5, the plate-shaped copper nanostructures decreased in the edge length and increased in the thickness, and more and more copper particles also were produced. The reducing driving force had a close connection with the pH when ascorbic acid was acted as the reducing agent.

Preparation of Wire-Shaped Copper Nanostructures

Preparation of Materials

BPEI (MW=750,000, 50 wt % solution in water), copper chloride ($CuCl_2$, purity≥99%), copper (II) nitrate ($Cu(NO_3)_2$), ascorbic acid ($C_6H_8O_6$, purity≥99%), sodium hydroxide (NaOH, purity≥98%), and nitric acid ($HNO_3$, ~70%) were purchased from Aldrich, and were used without further purification. Water was purified water (deionized water, DI water).

Measurement Method

Transmission electron microscopy (TEM) and high-resolution TEM (HRTEM) images were captured using a JEM-2100F microscope operating at 200 kV. Scanning electron microscopy (SEM) images were obtained using a LEO SUPRA 55 microscope. Powder X-ray diffraction (XRD) patterns of the products were obtained, using a Rigaku D-MAX/A diffractometer at 35 kV and 35 mA. Further, Fourier transform infrared spectroscopy (FT-IR) analysis was performed using a Jasco FTIR-6100 equipped with an ATR assembly in transmission mode, and X-ray photoelectron spectroscopy (XPS) data was obtained using a Thermal Scientific K-Alpha spectrometer.

Example 6

Preparation of Wire-Shaped Copper Nanostructures 0.04 g of BPEI and 0.135 g of $CuCl_2$ were dissolved in 2 mL of purified water using a magnetic bar. 3 mL of ascorbic acid solution (0.167 M) was then added thereto using a micropipette (a final volume of the solution was 5 mL and a weight ratio of BPEI/CuCl$_2$ was 0.3). The pH of the resulting solution was 2.9. The resulting solution was aged at 90° C. for 3 hours, and was then cooled down to room temperature. The product was washed with purified water three times to remove the remaining reactants, and centrifugation was repeated to obtain a final product.

Figure 20:
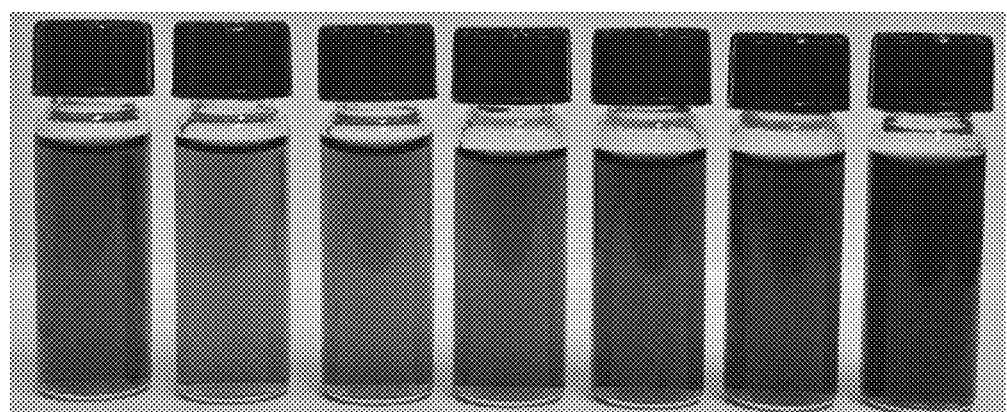
FIG. 20 shows series of color changes upon addition of ascorbic acid to an aqueous solution containing $CuCl_2$ and BPEI in Example 6, in which the color changes takes place from blue (left) to dark brownish-red (right)

After addition of ascorbic acid to the aqueous solution containing CuCl$_2$ and BPEI, the solution gradually changed color from blue to green, and finally to dark brownish-red, indicating the reduction of Cu$^{2+}$ to Cu$^0$ by ascorbic acid (see FIG. 20).

FIGS. 12a and 12b show the formation of long and uniform wire-shaped copper nanostructures without any post-treatment or separation. The nanowires had an average length of 142.14±42.6 µm and an average diameter of 472.9±100.3 nm as calculated from 100 nanowires randomly selected from a number of SEM images (see FIG. 21).

The wire-shaped copper nanostructures exhibited a single-crystal structure, and the growth orientation was along the direction [011], as can be seen in the selected area electron diffraction (SAED) pattern and HRTEM image (see FIG. 12c and FIG. 22).

Figure 23:
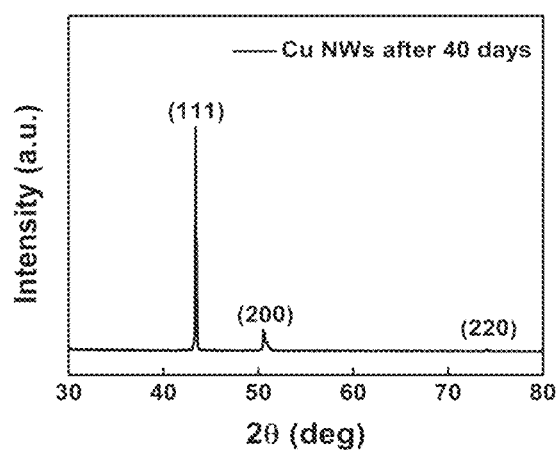
FIG. 23 shows XRD patterns of wire-shaped copper nanostructures synthesized according to Example 6, after being exposed to air for 40 days.

FIG. 12d shows powder XRD patterns of the nanowires, indicating the presence of diffraction peaks at 43.5°, 50.6°, and 74.2°, which can be assigned respectively to the (111), (200), and (220) planes of face-centered cubic (FCC) copper (Fm3m, a=3.615 Å, Joint Committee on Powder Diffraction Standard (JCPDS) file number 04-0836). Any diffraction peaks of oxide phases such as Cu$_2$O and CuO were not observed. XPS was used to probe the formation of Cu$_2$O or CuO layers on the surface of the wire-shaped copper nanostructures. The two strong peaks at 932.8 and 952.6 eV were attributed to Cu 2p$_{3/2}$ and Cu 2p$_{1/2}$ core levels, confirming the metallic structure of the wire-shaped copper nanostructures (FIG. 13a). In addition, the XRD patterns of the wire-shaped copper nanostructures stored at room temperature for 40 days still showed only the presence of Cu metal without Cu$_2$O or CuO, indicating the long-term stability of the wire-shaped copper nanostructures (see FIG. 23).

A FT-IR transmission spectrum of the wire-shaped copper nanostructures exhibited distinct peaks at 3420 and 1635 cm$^{-1}$, which were assigned to stretching and bending modes of amine groups (—N—H). FIG. 13b shows that the absorption peaks at 2930 and 1037 cm$^{-1}$ were assigned to stretching bands of —C—H, and —C—N, respectively, in the presence of BPEI on the surface of the wire-shaped copper nanostructures. Because BPEI is known as a weak reducing agent, it is believed that BPEI prevented the surface oxidation of the wire-shaped copper nanostructures. The BPEI may be removed by several washing with ethanol. Thereafter, when the wire-shaped copper nanostructures were stored for 40 days at room temperature, thin CuO layer were formed on the surface of the wire-shaped copper nanostructures. XRD and XPS results show the presence of CuO layer on the surface of wire-shaped copper nanostructures while major crystal structure was still metallic copper (see FIG. 24). These results indicate the importance of BPEI for the stability of wire-shaped copper nanostructures.

FIG. 14 shows TEM and SEM images of the wire-shaped copper nanostructures at the reaction time of (a) 15 min, (b) 20 min, (c) 30 min, and (d) 3 hr respectively. At an early stage of 15 min, only small copper nanoparticles with sizes of around 20 nm were synthesized (FIG. 14a). At the reaction time of 20 min, a TEM image shows the presence of short copper nanorods with length of 5 µm and diameter of around 400 nm (FIG. 14b). As the reaction proceeded to 30 min and 3 hr, the short copper nanorods started to grow to long nanowires while keeping their diameter of around 400 nm (see FIGS. 14c and 14d). The wire-shaped copper nanostructures were grown from small copper nanoparticles formed at the initial stages of the reaction without any change in the diameter.

When the synthesis was conducted in the presence of Cu(NO$_3$)$_2$ as a precursor instead of CuCl$_2$, copper nanoparticles with cubic and pyramidal shapes were synthesized, as shown in FIG. 15a. On the other hand, long wire-shaped copper nanostructures were observed when the synthesis was conducted in the presence of Cu(NO$_3$)$_2$ and KCl, instead of CuCl$_2$, as shown in FIG. 15b, clearly showing the importance of Cl$^-$ ion in the formation of wire-shaped copper nanostructures.

Experimental Example 2

Test of Long-Term Stability of Wire-Shaped Copper Nanostructures

The wire-shaped copper nanostructures prepared according to Example 6 were stored at room temperature for 40 days, and then XRD patterns were analyzed. As a result, XRD patterns measured immediately after synthesis were consistent with those measured at 40 days after synthesis. Even after being stored at room temperature for 40 days, the wire-shaped copper nanostructures showed only the presence of copper metal without formation of Cu$_2$O or CuO on the surface, indicating the long-term stability of the wire-shaped copper nanostructures.

Example 7

Preparation at Different Weight Ratios of BPEI/CuCl$_2$

When a weight ratio of BPEI/CuCl$_2$ was 0, that is, in the absence of BPEI, the formation of irregular and aggregated particles was observed, as shown in the SEM image of FIG. 16a. FIG. 16b shows that the product was a mixture of Cu and CuCl (F43m, a=5.405 Å, JCPDS file number 77-2383) instead of Cu metal. This result indicates that BPEI acts as a reducing agent for the complete reduction of Cu$^{2+}$ to Cu metal.

When the weight ratio of BPEI/CuCl$_2$ was as low as 0.1, a small number of short wire-shaped copper nanostructures (about 20~80 µm in length) and nanoparticles were produced, as shown in FIG. 16c. At low weight ratios, there was not enough BPEI to effectively cap the copper seeds, resulting in the formation of a small portion of wire-shaped copper nanostructures. When the weight ratio of BPEI/CuCl$_2$ was increased to 0.3, long wire-shaped copper nanostructures having long-term stability were successfully synthesized. When the weight ratio of BPEI/CuCl$_2$ was 1.2, large particles can be seen with a small number of short wire-shaped copper nanostructures, as shown in FIG. 16d. It would be seem that the formation of a stable BPEI-Cu complex occurred via thermal dynamic growth of copper nanoparticles, thus limiting the formation and growth of long nanowires.

Example 8

Preparation at Different pH

Under strong acidic conditions of pH 1.8, thick and short wire-shaped copper nanostructures were observed, due to the weak stabilization ability of BPEI, as shown in FIG. 17a. In contrast, as the pH was increased to 5.3, large particles were formed in the final product, as shown in FIG. 17b. It is believed that increased pH led to the fast reduction rate of $Cu^{2+}$ by ascorbic acid.

Example 9

Preparation at Different Temperature

At low reaction temperatures (60° C.), the amine groups of BPEI were not sufficiently activated to stabilize the wire-shaped copper nanostructures, thus leading to the formation of small and non-uniform wire-shaped copper nanostructures, as shown in FIG. 18a. On the other hand, at a high reaction temperature of 100° C., a large portion of nanoparticles with long wire-shaped copper nanostructures was observed, as shown in SEM images of FIG. 18b.

Preparation of Sphere-Shaped Copper Nanostructures

Preparation of Materials

Copper fluoride ($CuF_2$, purity≥98%), copper nitrate ($Cu(NO_3)_2$), BPEI (MW=750,000, 50 wt % solution in water), polyvinylpyrrolidone (PVP, MW=10,000), ascorbic acid ($C_6H_8O_6$, purity≥99%), sodium hydroxide (NaOH, purity≥98%), and potassium bromide (KBr), nitric acid ($HNO_3$, 70%) were purchased from Aldrich, and were used without further purification. Water was purified water (de-ionized water, DI water).

Measurement Method

Powder X-ray diffraction (XRD) patterns of the products were obtained using a Rigaku D-MAX/A diffractometer at 35 kV and 35 mA. Transmission electron microscopy (TEM) and high-resolution TEM (HRTEM) images were captured using a JEM-2100F microscope operating at 200 kV. Scanning electron microscopy (SEM) images were obtained using a LEO SUPRA 55 microscope. Further, X-ray photoelectron spectroscopy (XPS) data was obtained using a Thermal Scientific K-Alpha spectrometer.

Example 10

Figure 19:
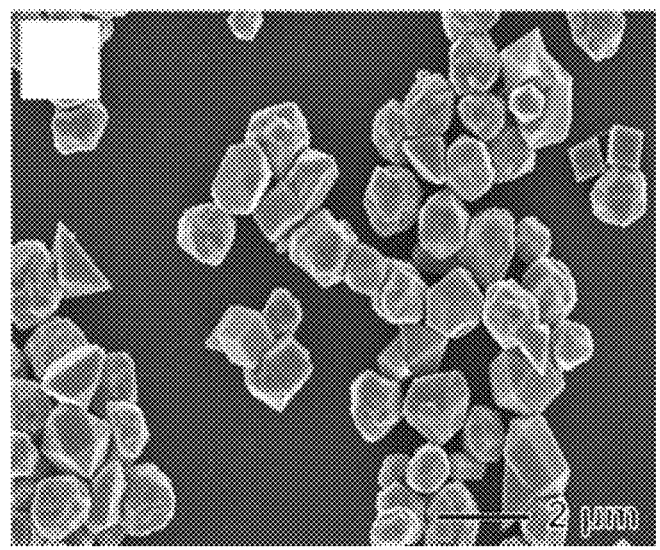
FIG. 19 shows SEM images of sphere-shaped copper nanostructures synthesized according to Example 10.

Preparation of Sphere-Shaped Copper Nanostructures 0.04 g of BPEI and 0.01 g of $CuF_2$ were dissolved in 2 mL of purified water using a magnetic bar. 3 mL of ascorbic acid solution (0.167 M) was then added thereto using a micropipette. The resulting solution was left at 90° C. for 3 hours, and then cooled down to room temperature. The solution was washed with purified water three times to remove the remaining reactants, and centrifugation was repeated to obtain a final product. SEM images of the final product are shown in FIG. 19. The final product showed an overall spherical shape, more specifically, including cubic, pyramidal, bipyramidal, and other polyhedral shapes. Further, the spherical copper nanostructures showed long-term, stability without formation of copper oxides even after being stored at room temperature for 40 days.

What is claimed is:

1. A preparation method of a sphere-shaped or plate-shaped copper nanostructure, wherein a copper precursor comprising halide is reacted with polyethyleneimine (PEI) and a reducing agent in an aqueous solution, wherein the halide is fluoride or bromide, and wherein the copper nanostructure is prepared in a spherical form or a plate form when the halide is fluoride or bromide, respectively.

2. The method of claim 1, wherein the polyethyleneimine is branched polyethyleneimine (BPEI).

3. The method of claim 1, wherein the reducing agent is one or more selected from the group consisting of ascorbic acid, sodium hydroxide (NaOH), potassium hydroxide (KOH), hydrazine ($N_2H_4$), sodium hydrophosphate, glucose, tannic acid, dimethylformamide, tetrabutylammonium borohydride, sodium borohydride ($NaBH_4$), and lithium borohydride ($LiBH_4$).

4. The method of claim 1, wherein a ratio of mass amounts of the polyethyleneimine and the copper precursor in the aqueous solution is 1:1 to 20:1.

5. The method of claim 1, wherein the reaction further comprises polyvinylpyrrolidone (PVP).

6. The method of claim 1, wherein of the aqueous solution is 2 to 7.

7. The method of claim 1, wherein the reaction temperature is 65° C. to 110° C.

* * * * *

UNITED STATES PATENT AND TRADEMARK OFFICE
CERTIFICATE OF CORRECTION

PATENT NO. : 10,464,136 B2
APPLICATION NO. : 15/262180
DATED : November 5, 2019
INVENTOR(S) : Taekyung Yu, Woo-Sik Kim and Zengmin Tang Page 1 of 1

It is certified that error appears in the above-identified patent and that said Letters Patent is hereby corrected as shown below:

In the Claims

In Claim 6, Column 14, Line 39, after wherein insert --the pH--.

Signed and Sealed this
Thirty-first Day of March, 2020

Andrei Iancu
*Director of the United States Patent and Trademark Office*